(12) United States Patent
Zhu et al.

(10) Patent No.: US 12,136,864 B2
(45) Date of Patent: Nov. 5, 2024

(54) SEALING SYSTEM FOR OCEAN POWER GENERATION EQUIPMENT

(71) Applicant: HANGZHOU LHD INSTITUTE OF NEW ENERGY, LLC, Hangzhou (CN)

(72) Inventors: Fuwei Zhu, Hangzhou (CN); Dong Lin, Hangzhou (CN); Xiaonan Miao, Hangzhou (CN); Zhenhua Wu, Hangzhou (CN); Enle Lin, Hangzhou (CN); Fang Jiang, Hangzhou (CN); Zhendong Chen, Hangzhou (CN); Hongyue Tian, Hangzhou (CN)

(73) Assignee: HANGZHOU LHD INSTITUTE OF NEW ENERGY, LLC, Hangzhou (CN)

( * ) Notice: Subject to any disclaimer, the term of this patent is extended or adjusted under 35 U.S.C. 154(b) by 294 days.

(21) Appl. No.: 17/654,516

(22) Filed: Mar. 11, 2022

(65) Prior Publication Data
US 2022/0200391 A1    Jun. 23, 2022

Related U.S. Application Data

(63) Continuation of application No. PCT/CN2019/105811, filed on Sep. 12, 2019.

(51) Int. Cl.
*H02K 5/132* (2006.01)
*F03B 11/00* (2006.01)
(Continued)

(52) U.S. Cl.
CPC ............ *H02K 5/132* (2013.01); *F03B 11/006* (2013.01); *H02K 5/10* (2013.01); *H02K 7/1823* (2013.01);
(Continued)

(58) Field of Classification Search
CPC ........ H02K 5/132; H02K 5/10; H02K 7/1823; F03B 11/006; F05B 2240/57;
(Continued)

(56) References Cited

U.S. PATENT DOCUMENTS 4,395,141 A * 7/1983 Pietsch ................ B63H 23/321
277/927
5,643,026 A * 7/1997 Pietsch .................. F16J 15/004
277/927

(Continued)

FOREIGN PATENT DOCUMENTS

CA    3054844 A1    9/2018
CN    104329205 A    2/2015
(Continued)

OTHER PUBLICATIONS

"International Application No. PCT/CN2019/105811, International Search Report and Written Opinion mailed Jun. 10, 2020", (Jun. 10, 2020), 9 pgs.

*Primary Examiner* — Gilbert Y Lee
(74) *Attorney, Agent, or Firm* — Schwegman Lundberg & Woessner, P.A.

(57) ABSTRACT

The disclosure provides a sealing system applicable for an ocean power generation device, which includes at least one first seal and a water leakage protection device. The water leakage protection device is located at a side of at least one first seal away from seawater, and includes a sealed water storage tank and a drain pipe. The sealed water storage tank collects and stores seawater leaked from the at least one first seal. One end of the drain pipe is communicated with the sealed water storage tank, and the seawater stored in the sealed water storage tank is discharged through the drain pipe.

13 Claims, 4 Drawing Sheets

(51) Int. Cl.
*H02K 5/10* (2006.01)
*H02K 7/18* (2006.01)

(52) U.S. Cl.
CPC ..... *F05B 2240/57* (2013.01); *F05B 2260/602* (2013.01); *F05B 2260/603* (2013.01)

(58) Field of Classification Search
CPC ........... F05B 2260/602; F05B 2260/603; F16J 15/3232; F16J 15/324; F16J 15/3248; F16J 15/3268
See application file for complete search history.

(56) References Cited

U.S. PATENT DOCUMENTS

| | | | |
|---|---|---|---|
| 6,481,720 B1 * | 11/2002 | Yoshida | F16J 15/002 277/927 |
| 8,348,281 B2 * | 1/2013 | Yoshida | F16J 15/322 277/560 |
| 9,404,582 B2 * | 8/2016 | Wrage | F16N 7/36 |
| 2009/0140524 A1 | 6/2009 | Kejha | |
| 2018/0030952 A1 | 2/2018 | Wang | |

FOREIGN PATENT DOCUMENTS

| | | | |
|---|---|---|---|
| CN | 205315195 U | 6/2016 | |
| CN | 105781864 A | 7/2016 | |
| CN | 106939870 A | 7/2017 | |
| CN | 108087180 A | 5/2018 | |
| WO | WO-2011062484 A2 * | 5/2011 | ........... B63H 23/321 |
| WO | WO-2021046830 A1 | 3/2021 | |

* cited by examiner

SEALING SYSTEM FOR OCEAN POWER GENERATION EQUIPMENT

CROSS-REFERENCE TO RELATED APPLICATIONS

This application is a continuation of International Application No. PCT/CN2019/105811, filed on Sep. 12, 2019, entitled "SEALING SYSTEM FOR OCEAN POWER GENERATION EQUIPMENT," the benefit of priority of which is claimed herein, and which application is hereby incorporated herein by reference in its entirety.

TECHNICAL FIELD

The disclosure belongs to a field of ocean power generation, in particular to a sealing system applicable for an ocean power generation device.

BACKGROUND ART

Ocean energy (including tidal energy, wave energy, ocean current energy, etc.) is a type of clean and pollution-free renewable energy with abundant reserves and a wide distribution, which has excellent developing prospect and value. The ocean energy is mainly used to generate power, and its operating principle is similar to that of wind power generation, that is, mechanical energy of seawater is converted into electric energy through an energy conversion device. Specifically, firstly, the seawater impacts a water turbine, which captures kinetic energy of the seawater and then converts the kinetic energy of the seawater into rotating mechanical energy which drives a generator to generate power through a mechanical transmission system and finally is converted into electric energy.

The water turbine is a key component that can capture the kinetic energy of the seawater, which directly affects power generation efficiency of a whole generator set. Currently, water turbines for the ocean energy widely used in the world are mainly classified into vertical axis ones and horizontal axis ones. Compared with the vertical axis water turbines, the horizontal axis water turbines are with a simpler structure, lighter weight and higher energy capture efficiency, and have gradually become a mainstream form of an ocean energy generator set.

A blade is a core component of the horizontal axis water turbine to capture the ocean energy. According to a fact whether a pitch angle of the blade is adjustable, it can be classified into two types: one type with a fixed pitch and the other type with a variable pitch. An advantage of the one with the fixed pitch is that it does not need to change the pitch and its structure is simple. However, due to periodic characteristics of reciprocating and flow rate changing of the ocean energy, the fixed pitch has some disadvantages such as poor controllability and no ability to realize a high efficiency conversion rate of the ocean energy, which eventually leads to waste of ocean energy resources and rising cost of an ocean power generation device.

Compared with the fixed pitch, the variable pitch provides two main advantages: firstly, according to reciprocating characteristics of the ocean energy, the pitch angle of the blade can be adjusted in real time, so that the blade is directly faced toward a coming direction of a tidal current, so as to capture a maximum kinetic energy, thus making the water turbine easier to start, reducing a starting flowing speed, and operating efficiently at a high tide and a low tide; and secondly, when a speed of the tidal current exceeds a rated speed, the pitch angle can be adjusted to reduce the kinetic energy captured by the blade, so as to ensure that the water turbine can operate efficiently at a rated power (without exceeding a load). To sum up, by adjusting the pitch angle, starting characteristics and operational reliability of the ocean energy water turbine can be improved, and power can be generated at both the high tide and the low tide, thus prolonging operating time in a tidal cycle and improving a total energy gaining efficiency and power generation efficiency.

Because of a requirement to adjust the pitch angle, it is necessary to set a pitch system at a hub. The pitch system is a core component of a whole generator set. A control system and a lubrication system or the like matching with the pitch system are all need regular maintenance and repairing. A seal of the blade also needs to be replaced regularly to ensure safe operations of the power generation device. A function of sealing of the pitch is to isolate the pitch system in a cabin where the hub is located from external seawater, and to ensure that the set can smoothly start and feather the blade under various operating conditions and realize safe and stable operations of the set. If the sealing is poor, seawater containing silt and impurities will leak into the hub, which will lead to damage to the pitch system and endanger service life and operation safety of the whole water turbine.

In the prior art, a part of ocean power generation devices operates directly without considering this problem, which leads to device damage and a greatly increased maintenance rate. Some people pay attention to this problem, and regularly lift the whole generator set out of the sea for maintenance and repairing. However, this maintenance method increases power generation cost, reduces the power generation time, and ultimately affects commercial application of the whole power generation device.

SUMMARY

In order to overcome at least one deficiency in the prior art, the disclosure provides a sealing system for an ocean power generation device.

According to an aspect of the present disclosure, there is provided a sealing system applicable for an ocean power generation device, which has at least two variable-pitch blades; the sealing system is correspondingly arranged at a root of each of the blades. The seal system includes at least one first seal and a water leakage protection device. The water leakage protection device is located at a side of at least one first seal away from seawater, and includes a sealed water storage tank and a drain pipe. The sealed water storage tank collects and stores seawater leaked from the at least one first seal. One end of the drain pipe is communicated with the sealed water storage tank, and the seawater stored in the sealed water storage tank is discharged through the drain pipe.

According to an embodiment of the present disclosure, the sealing system further includes at least one second seal located at a side of the at least one first seal proximate to the seawater. The at least one second seal does not function to seal when the ocean power generation device operates normally, the at least one first seal functions to seal when the ocean power generation device operates normally, and when the at least one first seal needs to be removed or replaced, the at least one second seal operates to function to seal.

According to an embodiment of the present disclosure, the sealing system further includes at least one third seal, which is located at a side of the at least one first seal proximate to the seawater to resist silt.

According to an embodiment of the present disclosure, the sealing system further includes a one-way water stop valve located in a pipeline of the drain pipe.

According to an embodiment of the present disclosure, a bottom of the water storage tank is obliquely disposed, and is obliquely disposed in a direction from proximate to the first seal to away from the first seal, and the drain pipe is communicated with a lowest position of the bottom of the water storage tank.

According to an embodiment of the disclosure, the ocean power generation device includes a hub, a generator, a spindle connecting the hub and the generator, a first sealed cabin and a second sealed cabin. The hub is located in the first sealed cabin, the generator is located in the first sealed cabin or the second sealed cabin, the first sealed cabin rotates with the hub, the second sealed cabin is relatively stationary, and the other end of the drain pipe passes through an interior of the spindle to discharge the seawater stored in the water storage tank into the second sealed cabin.

According to an embodiment of the present disclosure, the sealing system further includes a water collecting tank and a water pump. The water collecting tank is located in the second sealed cabin to collect the seawater discharged from the drain pipe, and the water pump sucks the seawater in the water collecting tank above a water surface for discharging.

According to an embodiment of the present disclosure, the ocean power generation device further includes an outer shaft, one end of which is communicated with the second sealed cabin and the other end of which is located above the water surface, and the water pump sucks the seawater in the water collecting tank above the water surface through the outer shaft for discharging.

According to an embodiment of the present disclosure, the at least one first seal and/or the water leakage protection device has a half or halved structure.

According to another aspect of the present disclosure, there is also provided a sealing system applicable for the ocean power generation device. The ocean power generation device includes a hub, a generator and a spindle connecting the hub and the generator. The sealing system is arranged on the spindle. The seal system includes at least one first seal and a water leakage protection device. The water leakage protection device is located at a side of at least one first seal away from seawater, and includes a sealed water storage tank and a drain pipe. The sealed water storage tank collects and stores seawater leaked from the at least one first seal. One end of the drain pipe is communicated with the sealed water storage tank, and the seawater stored in the sealed water storage tank is discharged through the drain pipe.

According to an embodiment of another aspect of the present disclosure, the sealing system further includes at least one second seal located at a side of the at least one first seal proximate to the seawater. The at least one second seal does not function to seal when the ocean power generation device operates normally, the at least one first seal functions to seal when the ocean power generation device operates normally, and when the at least one first seal needs to be removed or replaced, the at least one second seal operates to function to seal.

According to an embodiment of another aspect of the present disclosure, the sealing system further includes at least one third seal, which is located at a side of the at least one first seal proximate to the seawater to resist silt.

According to an embodiment of another aspect of the present disclosure, the sealing system further includes a one-way water stop valve located in a pipeline of the drain pipe.

According to an embodiment of another aspect of the present disclosure, a bottom of the water storage tank is obliquely disposed, and is obliquely disposed in a direction from proximate to the first seal to away from the first seal, and the drain pipe is communicated with a lowest position of the bottom of the water storage tank.

According to an embodiment of another aspect of the present disclosure, the sealing system further includes a water collecting tank and a water pump. The water collecting tank is located in the second sealed cabin to collect the seawater discharged from the drain pipe, and the water pump sucks the seawater in the water collecting tank above the water surface for discharging.

According to an embodiment of another aspect of the present disclosure, the ocean power generation device further includes an outer shaft, one end of which is communicated with the second sealed cabin and the other end of which is located above the water surface, and the water pump sucks the seawater in the water collecting tank above the water surface through the outer shaft for discharging.

According to an embodiment of another aspect of the present disclosure, the at least one first seal and/or the water leakage protection device has a half or halved structure.

To sum up, the sealing system arranged at the root of the blade of the present disclosure eliminates possibility of water ingress in the sealed cabin where the hub is located by providing the water leakage protection device, and fully protects the hub and a motor in the sealed cabin. Further, the water can be discharged conveniently; and the water can be discharged automatically only using the time during which the power generation device does not operate, its structure is simple and the cost can be reduced while the water discharging is achieved. The sealing system of the disclosure can also be independently arranged on the spindle to eliminate possibility of the seawater leaking into the sealed cabin along the spindle.

In order to make the above and other objects, features and advantages of the disclosure more obvious and understandable, a detailed description is made below for the preferred embodiments with reference to the accompanying drawings.

DETAILED DESCRIPTION

Figure 1:
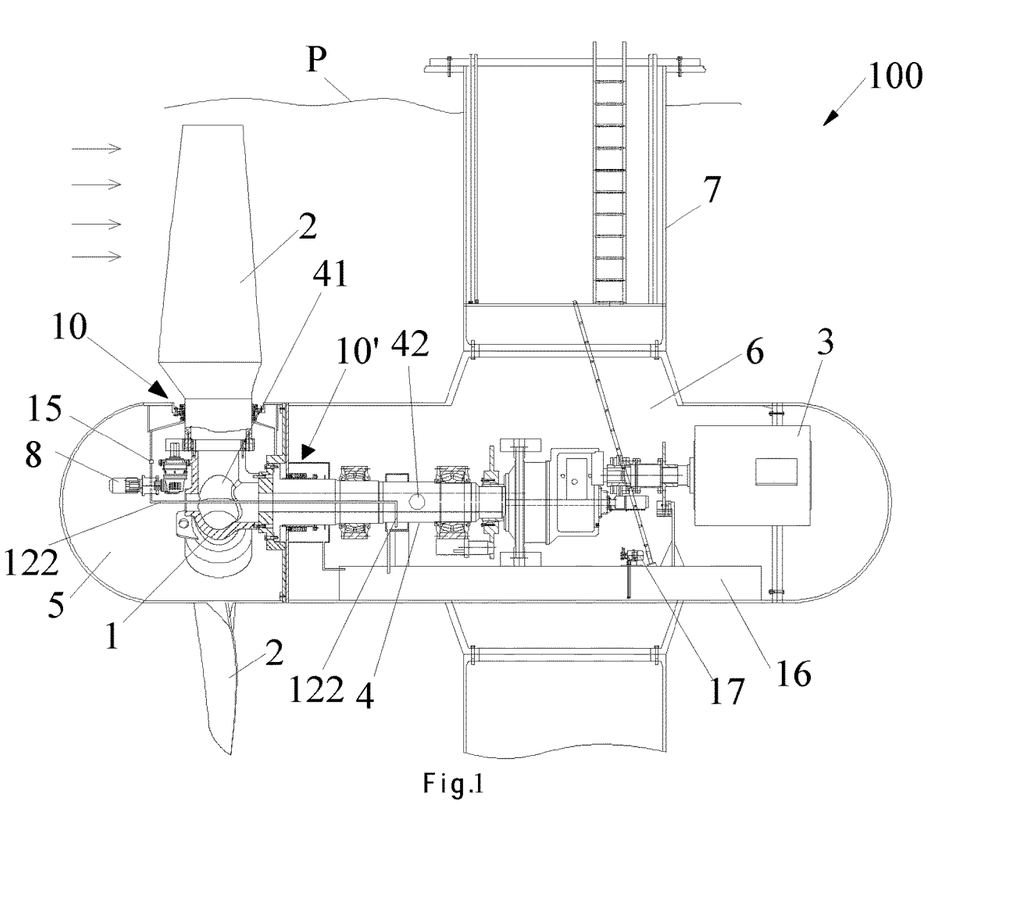
FIG. 1 is a partial sectional view of an ocean power generation device provided in a first embodiment of the present disclosure.

As shown in FIG. 1, the sealing system 10 is applicable for an ocean power generation device 100. In this embodiment, the ocean power generation device 100 includes a hub 1, at least two variable-pitch blades 2, a generator 3, a spindle 4 connecting the hub 1 and the generator 3, a first sealed cabin 5 and a second sealed cabin 6. The hub 1 is arranged in the first sealed cabin 5, the variable-pitch blades 2 are rotatably connected to the first sealed cabin 5, the generator 3 is arranged in the second sealed cabin 6, and one end of the spindle 4 is located in the first sealed cabin 5 and the other end thereof is located in the second sealed cabin 6. The first sealed cabin 5 rotates with the hub 1, and the second sealed cabin 6 is relatively stationary. However, the present disclosure is not limited to this. In other embodiments, the generator 3 can also be arranged in the first sealed cabin 5.

In this embodiment, the sealing system 10 is disposed at a root of each of the blades 2 (only an upper of the sealing system 10 is shown in FIG. 1). The seal system 10 includes at least one first seal 11 and a water leakage protection device 12. The water leakage protection device 12 is located at a side of at least one first seal 11 away from the seawater, relative to the first seal 11. The water leakage protection device 12 includes a sealed water storage tank 121 and a drain pipe 122. The sealed water storage tank 121 collects and stores seawater leaking from the at least one first seal 11. One end of the drain pipe 122 is communicated with the sealed water storage tank 121, and the seawater stored in the sealed water storage tank 121 is discharged through the drain pipe 122.

Specifically, the ocean power generation device of this embodiment uses the blades 2 with a variable pitch. Because a pitch system that can control rotation of the blades needs to be provided, the seawater is particularly easy to leak into the first sealed cabin 5 from the root of the blades 2. Solving a sealing problem of a joint between the blade with the variable pitch and the cabin where it is located is much more difficult than that for an ocean power generation device with fixed blades. Particularly, an application environment of the sealing system provided at the root of the blade is different from that provided elsewhere. Because an application environment of the sealing system provided at the spindle or other places is relatively static. However, the sealing system 10 provided at the root of the blade 2 is always in a rotating state because it is provided in the first sealed cabin 5 where the hub 1 is located. In this state, it is more difficult to ensure no water leakage, not to mention underwater replacement of the seal.

Figure 2:
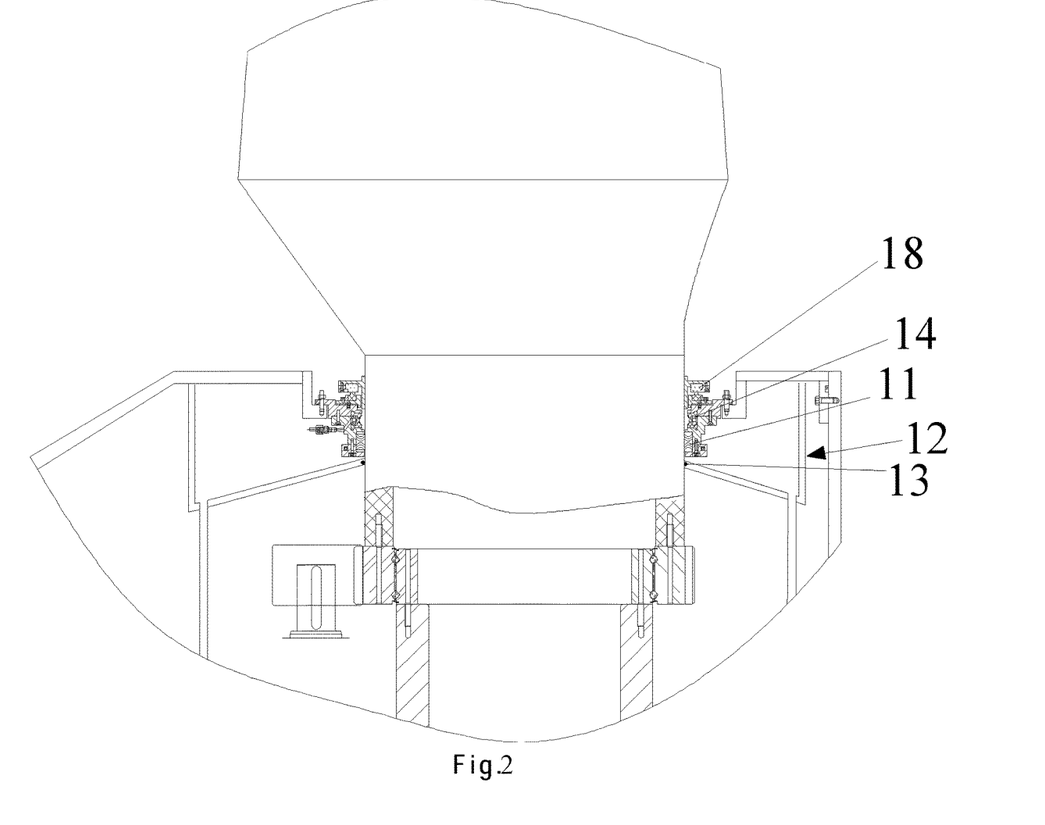
FIG. 2 is a partial enlarged sectional view of the sealing system provided at a root of a blade provided in the first embodiment of the present disclosure.

Preferably, the first seals 11 can be arranged in plurality. When a first seal 11 located on a side most proximate to the seawater (i.e., a outermost side) relax due to a long-term use, one or more first seals 11 located on an inner side can continue to functioning to seal to ensure sealing performance.

The first seal member 11 is particularly prone to aging and relaxation due to huge impact and a corrosive property of the seawater. Even if for the ocean power generation device of this embodiment, after a long-term use, the sealing performance of the first seal 11 degrades and the seawater leaks in. However, with the water leakage protection device 12 being provided, all the leaked seawater is collected by the water storage tank 121, which can ensure that the seawater will not directly spread to the hub 1 located in the first sealed cabin 5, thus avoiding damage to electronic elements (such as a motor 8 for controlling rotation of the blades, a gear box, etc.) in the first sealed cabin 5.

Particularly, although in the embodiments listed herein, the sealing system 10 is arranged at the root of the variable-pitch blade. However, it can be known by those skilled in the art undoubtedly that the sealing system 10 can also be arranged at the root of the fixed blade to function to seal and prevent leakage.

In this embodiment, the first seal 11 and/or the water leakage protection device 12 can have a half or halved structure, which is convenient for disassembly and installation. By providing the seal with this structure instead of a seal with unconventional structure (generally, it is a complete annular seal ring), it is very convenient to replace and install the seal without removing parts other than the seal. A defect in the prior art that the seal can only be replaced or removed after most of parts are disassembled is addressed. However, the present disclosure is not limited to this in any way.

In this embodiment, a fourth seal 13 is also provided at a place where the water storage tank 121 contacts a wall of the root of the blade 2. Because this place is statically sealed, with no external pressure, the fourth seal 13 here is not easy to relax, and it can be ensured that the water storage tank 121 is also sealed in the rotating state without water leakage.

In this embodiment, the sealing system 10 further includes a one-way water stop valve 15, which is located in a pipeline of the drain pipe 122. Preferably, a bottom of the water storage tank 121 is obliquely disposed, and is obliquely disposed in a direction from proximate to the first seal 11 to away from the first seal 11 (inclined downward when viewed from a direction shown in the figure), and the drain pipe 122 is communicated with a lowest position of the bottom of the water storage tank 121. This inclined structure is to make the leaked seawater accumulate at the bottom, so that the seawater can be quickly discharged from the drain pipe 122 in time.

In this embodiment, the other end of the drain pipe 122 passes through an interior of the spindle 4 to discharge the seawater into the second sealed cabin 6. The sealing system 10 further includes a water collecting tank 16 and a water pump 17. The water collecting tank 16 is located in the second sealed cabin 6 to collect the seawater discharged from the drain pipe 122, and the water pump 17 sucks the seawater in the water collecting tank 16 above the water surface for discharging. The ocean power generation device further includes an outer shaft 7, one end of which is communicated with the second sealed cabin 6 and the other end of which is located above the water surface P. The water pump 17 passes the seawater in the water collecting tank 16 through a water pipe and sucks it above the water surface through the outer shaft 7 for discharging. The outer shaft 7 can also be used for laying various lines (including but not limited to wires and water pipes).

Because the high tide and the low tide itself has a certain periodicity (periods for the high tide and the low tide in different water areas are different), when the ocean power generation device of this embodiment uses tidal energy to generate power, the ocean power generation device periodically stops operating due to slack tide or tidal stand. Take a period for the high tide and the low tide of 6 hours as an example, the ocean power generation device itself will be shut down four times a day due to slack tide or tidal stand. At this time, there is no need to take additional drainage measures, and the ocean power generation device of this embodiment can use a shutdown gap to discharge water.

A amount of seawater leaking from the root of the blade 2 in six hours is not large, and the water storage tank 121 can store the seawater leaking in this time period without an extra large volume, thus ensuring that other electrical elements in the first sealed cabin 5, such as the hub 1 or the motor 8 (the motor 8 for controlling the pitch of the blade 2), cannot be eroded by the seawater. In a case of slack tide or tidal stand, the first sealed cabin 5 and the hub 1 almost stop rotating. At this time, the first sealed cabin 5 can be electrically controlled to rotate slowly, and each blade 2 to be drained can be rotated to an uppermost position and stopped for a short period of time (preferably, the first sealed cabin 5 can be controlled to be relatively stationary by an electric brake system at this time), so that the water storage tank 121 can be drained.

Specifically, when the blade 2 rotates to an uppermost position shown in FIG. 1, water will be discharged through the one-way water stop valve 15 due to gravity. The one-way water stop valve 15 allows water in the water storage tank 121 to flow out through the drain pipe 122, but it cannot flow back to the water storage tank 121. In other words, "leakage prevention" and "drainage" of the root of the blade 2 can be realized without particularly complicated operation or complicated protection structure at all. A service frequency of a horizontal axis water turbine is greatly reduced, and service life of the horizontal axis water turbine is prolonged. In addition, as a double insurance, a level sensor (not shown) can be additionally provided to detect a water level in the water storage tank 121. When it is found that water leakage is larger than the preset value, an aged and loose seal can be found in time and replaced.

Preferably, the interior of the spindle 4 of this embodiment can allow service personnel to pass through, and the spindle 4 is provided with service ports 41 and 42 at the first sealed cabin 5 and the second sealed cabin 6, respectively, which can allow the service personnel to enter and exit. At this time, the service personnel can firstly pass through the access opening 42 via the second sealed cabin 6, then through the spindle 4, and then through the access opening 41 into the first sealed cabin 5. However, the present disclosure is not limited to this. In other embodiments, the spindle 4 may not allow the service personnel to pass through, and there may be other ways for the service personnel to enter the first sealed cabin 5 from the second sealed cabin 6.

In this embodiment, the sealing system 10 further includes at least one second seal 14, which is located at a side of the at least one first seal 11 proximate to the seawater. The at least one second seal 14 does not function to seal when the ocean power generation device operates normally, the at least one first seal 11 functions to seal when the ocean power generation device operates normally, and when the at least one first seal 11 needs to be removed or replaced, the at least one second seal 14 operates to function to seal.

It is precisely because the second seal 14 functions to seal at a specific time at which the first seal 11 can be directly removed or replaced. If there is no sealing environment provided by the second seal 14, directly removing or replacing the first seal 11 will lead to water leakage of the device. If the second seal 14 always functions to seal instead of functions to seal at a specific time, after a long period of operating, the second seal 14 inevitably ages and relaxes, and at this time, it cannot provide a sealing environment for replacing the first seal 11.

If there are multiple first seals 11, an outermost first seal 11 can be directly removed, and then remaining multiple first seals 11 can be displaced toward outside. At this time, although the outermost first seal 11 fails, an inner first seal 11 initially installed at the same time can still effectively function, greatly prolonging service life of the first seals 11 and completely avoiding a problem that the entire seals need to be replaced as long as the seal is loose in the prior art. However, the present disclosure is not limited to this. In other embodiments, there may be only one first seal 11. If the first seal 11 is loose, the first seal 11 needs to be replaced.

In the prior art, if the seal needs to be replaced, the whole ocean power generation device must be lifted out of the water surface from the sea, and a part of devices must be removed so as to replace the seal, which consumes a lot of manpower and material resources and keeps maintenance cost high. However, in the ocean power generation device of this embodiment, the service personnel can enter the first sealed cabin 5 through the second sealed cabin 6, and directly remove and replace the first seal 11 in the first sealed cabin 5, which makes it possible to remove or replace the seal underwater, thus greatly reducing the maintenance cost and promotes commercial development of the ocean power generation device. In addition, it is convenient and quick to remove or replace the seal underwater without removing the whole device.

Figure 3:
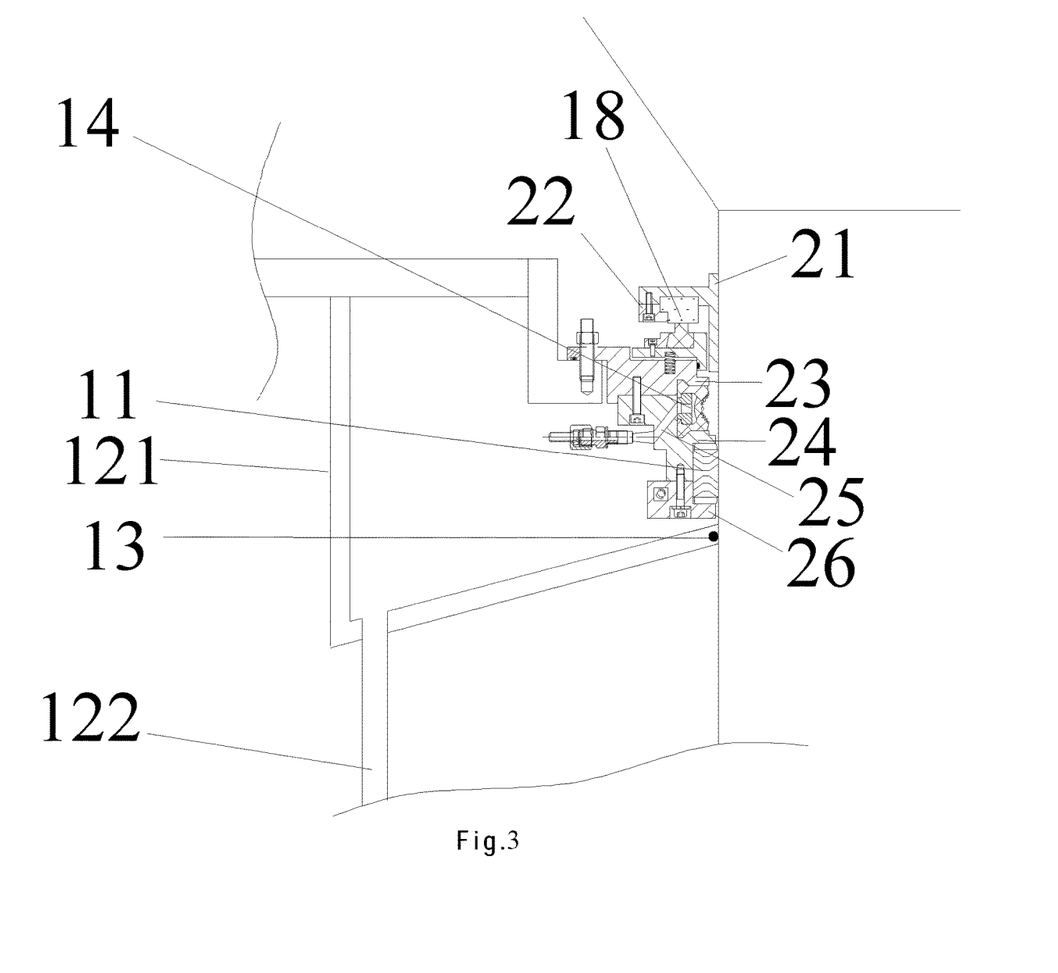
FIG. 3 is a partially enlarged schematic view of FIG. 2.

In this embodiment, the sealing system further includes at least one third seal 18, which is located at a side of the at least one first seal 11 proximate to the seawater to resist silt. The ocean power generation device of this embodiment uses three different seals 18, 14 and 11. Specifically, a shaft sleeve 21 of the blade is fixed to a blade shaft (i.e., the root of the blade 2) in interference connection. The shaft sleeve 21 provides shoulder positioning along an axial direction of the blade for installation of the third seal 18, and forms a sealing groove with a pressing plate 22 for fixing the third seal 18. In order to facilitate smooth installation of the third seal 18 in the sealing groove, the pressing plate 22 adopts a half or halved structure and is connected with the shaft sleeve 21 of the blade by bolts.

The third seal 18 most proximate to the seawater can be a J-shaped lip seal ring, which forms an interference with the shaft sleeve 21 of the blade by its own elastic tension and radially presses to form contact sealing, thus effectively preventing intrusion of the silt and impurities in the seawater. The lip seal ring has better activity and adaptability, and has smaller tolerance than other seals. At the same time, because it is a radial seal, it can make up for a shaft deviation of the rotating blade shaft. Preferably, at least two third seals 18 are provided to constitute safety redundancy. Preferably, the third seal 18 is made of composite polymer material. In the present disclosure, a specific structure and installation mode of the third seal 18 are not limited.

In this embodiment, the second seal 14 can be an air shroud type maintenance air seal. The second seal 14 is fixed to a sealed cavity formed by a sealing seat 23 and an inner cover plate 24. The inner cover plate 24 is mounted with an inflation tube joint 25 of a certain length, and the inner cover plate 24 is fixed to the sealing seat 23 by bolts. When the ocean power generation device operates normally, a certain gap is kept between a sealing lip of the second seal 14 and a surface of the blade shaft. When the first seal 11 needs to be replaced, that is, the second seal 14 needs to function to seal, a certain pressure of gas can be kept through an external pressure air pipe to make a lip of the air shroud protrude and form a tight contact sealing with the surface of the blade shaft, thus effectively preventing the seawater from leaking into the first sealed cabin 5. Preferably, the second seal 14 is made of composite polymer material.

In the present disclosure, a specific structure and installation mode of the second seal 14 are not limited. In other embodiments, the second seal 14 can be a metal seal, and a servomotor can be attached to the metal seal to provide power to drive the metal seal to move along a radial direction of the blade shaft. In addition, displacement feedback can be provided to keep formation of the servomotor being within an allowable range of error.

In this embodiment, the first seal 11 can be a V-shaped seal, which is fixed in the sealing cavity formed by the inner cover plate 24 and a gland 26. The inner and outer diameters of the first seal 11 form interference radial extrusion contact sealings with the surface of the blade shaft and the inner cover plate 24, which ensures zero leakage of the seawater. The gland 26 can have a half or halved structure, and is integrated by bolts and detachably fixed to the inner cover plate 24. When the first seal 11 is replaced, the gland 26 can be disassembled in half, then an original first seal 11 can be destroyed, then a new first seal can be installed and the gland 26 can be reinstalled. In this way, replacement of the first seal 11 is simple, and it can be repaired and replaced without lifting the whole generator set out of the water surface and removing parts, and without taking up a large amount of construction period and removing the blade. Preferably, the first seal 11 is made of composite polymer material. In the present disclosure, a specific structure and installation mode of the first seal 11 are not limited.

Seals made of composite polymer materials are resistant to hydrolysis and seawater corrosion, with low wear loss, excellent aging resistance, strong anti-extrusion ability, and a reduced risk of silt and impurities invading the first sealed cabin. It is further with a good installability, its sealing size is not limited, and it can be partially installed or installed by hot-melt bonding on site.

Figure 4:
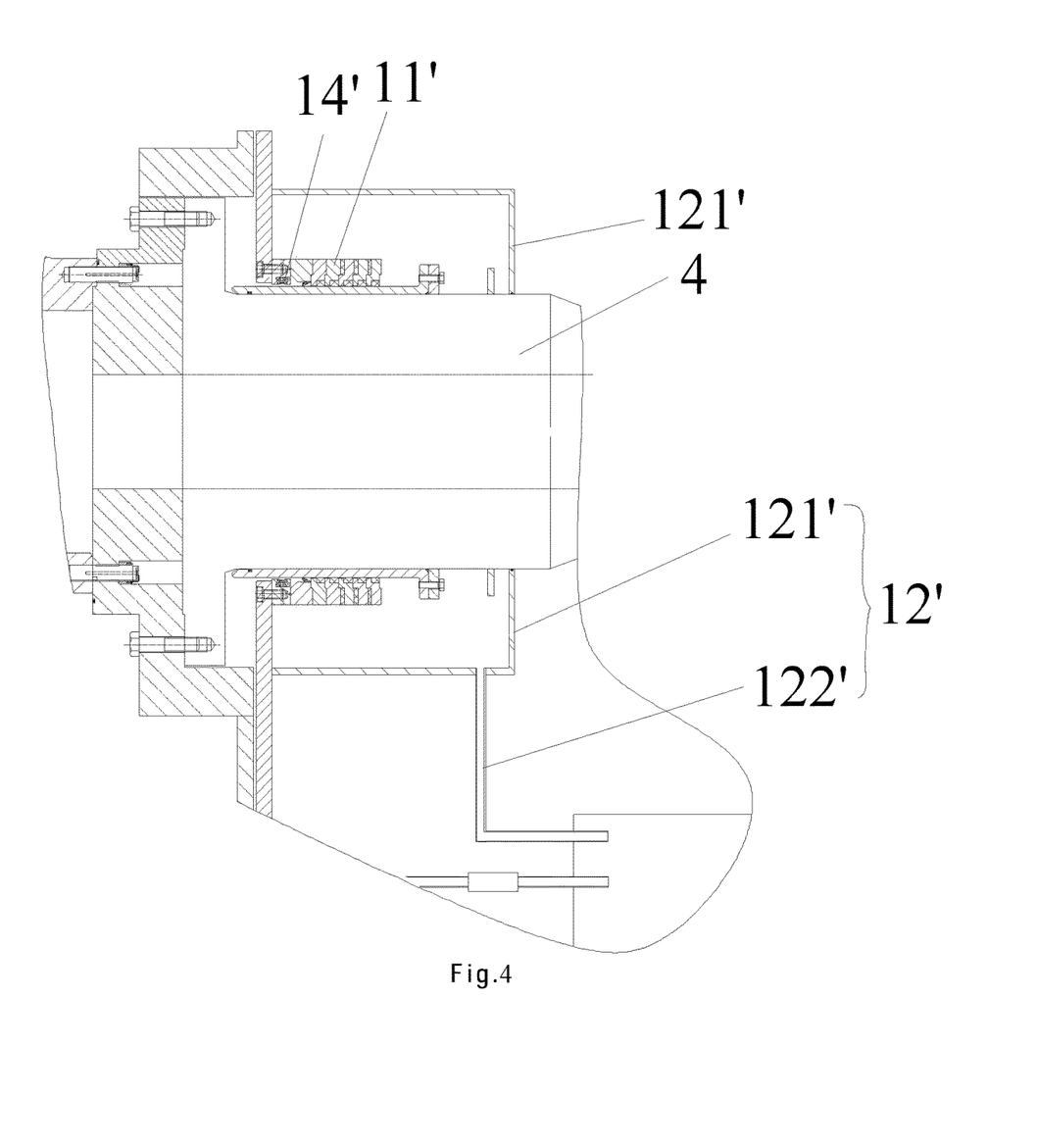
FIG. 4 is a partially enlarged sectional view of the sealing system provided at a spindle provided in the second embodiment of the present disclosure.

Because the spindle 4 (that is, the transmission shaft) connecting the hub 1 of the horizontal axis water turbine and the generator 3 is respectively inserted in two sealed cabins, the sealing system provided at a joint of the spindle and the second sealed cabin 6 also faces similar problems. In a second embodiment, the ocean power generation device further includes a sealing system 10' provided on the spindle 4. In other words, the sealing system provided in the present disclosure can be provided not only at the root of the blade 2, but also on the spindle 4 connecting the hub 1 and the generator 3. The sealing system 10' provided on the spindle 4 is similar to the sealing system 10 provided at the root of the blade 2. All structures or components used in the sealing system 10 in the first embodiment can be applied to the sealing system 10'.

As shown in FIGS. 1 and 4, the sealing system 10' includes at least one first seal 11' and a water leakage protection device 12'. The water leakage protection device 12' is located at a side of at least one first seal 11' away from seawater, and includes a sealed water storage tank 121' and a drain pipe 122'. The sealed water storage tank 121' collects and stores seawater leaking from the at least one first seal 11'. One end of the drain pipe 122' is communicated with the sealed water storage tank 121', and the seawater stored in the sealed water storage tank 121' is discharged through the drain pipe 122'.

Relevant features in respective embodiment of the disclosure can be freely arranged and combined according to actual needs, which all are within a protection scope of the disclosure. For example, the ocean power generation device in the second embodiment may also have the second seal 14' in the first embodiment. The second seal 14' is located at a side of the at least one first seal 11' proximate to the seawater (i.e. a left side in the figure). When the first seal 11' needs to be replaced, the at least one second seal 14' does not function to seal when the ocean power generation device operates normally, the at least one first seal 11' functions to seal when the ocean power generation device operates normally, and when the at least one first seal 11' needs to be removed or replaced, the at least one second seal 14' operates to function to seal. Types of the first seal 11' and the second seal 14' can be as shown in the first embodiment.

If there are multiple first seals 11', an outermost first seals 11' can be directly removed, and then remaining multiple first seals 11' can be displaced toward outside (left side in the figure). A problem that the entire seals need to be replaced as long as the seal is loose in the prior art can be completely avoided. However, the present disclosure is not limited to this. In other embodiments, there may be only one first seal 11'. If the first seal 11' is loose, the first seal 11' needs to be replaced. Particularly, the service personnel can enter the first sealed cabin 5 through the second sealed cabin 6, and directly remove or replace the seal underwater.

The sealing system of the present disclosure can be arranged at any place where the ocean power generation device needs to be sealed, which is within the protection scope of the present application. A case that the sealing system 10' is provided on the spindle 4 but without the sealing system 10 being provided on the root of the blade 2 is also within the protection scope of the present application. Although the sealing system 10 installed at the root of the blade 2 and the sealing system 10' installed on the spindle 4 are simultaneously depicted in FIG. 1, these two sealing systems can exist independently. That is, the ocean power generation device may only have the sealing system 10 installed at the root of the blade 2 or only have the sealing system 10' installed on the spindle 4.

To sum up, the sealing system 10 of the embodiment of the present disclosure is arranged at the root of the blade 2, which can isolate the hub 1 from the external seawater, effectively prevent seawater containing silt and impurities from leaking into the hub 1 and truly realize zero leakage, thus ensuring that the generator set can smoothly start and feather the blade under various operating conditions, and realize safe and stable operations of the set. Similarly, the sealing system 10' of the embodiment of the present disclosure is arranged on the spindle 4, which can isolate the electronic elements (such as the generator 3) in the second sealed cabin 6 from the seawater, effectively preventing seawater containing silt and impurities from leaking into the second sealed cabin 6 and realizing zero leakage.

Sealing is a crucial point for whether the ocean power generation device can generate power stably and effectively for a long time, which is also a problem easily overlooked by those skilled in the art. In the prior art, a problem of replacing the seal underwater has never been considered, because it is not considered that the service personnel can go underwater for direct maintenance. Particularly, an existing sealing structure can be used for at most five years, in other words, it means that the whole generator set must be lifted out of a sea surface to replace the seal anyway in five years. Needless to say, in practice, due to complex environment of an ocean, the seal can't be used for five years at all. In the prior art, if the seal needs to be replaced, the whole ocean power generation device needs to be lifted out of the water surface firstly, and then the seal can be truly replaced only after most parts and components of the hub and the blade of the horizontal axis water turbine are removed. In an embodiment, manual underwater replacement of the seal can be realized in the disclosure without lifting the generator set out of the water surface and disassembling the parts of the hub, which is convenient and time-saving to maintain and prolongs the service life of the whole set.

Particularly, a plurality of seal can be provided in the sealing system in the disclosure to ensure zero leakage. Secondly, even if sealing performance of the outer first seal degrades or fails due to long-term use, the second seal (such as an inflatable seal) is started at this time to isolate the external seawater, so that the seal of the ocean power generation device can be replaced. In an embodiment, the service personnel can enter the second sealed cabin and then enter the first sealed cabin to remove or replace the failed first seal. With this provision, it is possible to directly replace the seal, and a disadvantage that the seal can be removed or replaced only when the whole ocean energy generating device is lifted out of the sea surface is also avoided in the prior art. By directly performing service underwater, the ocean power generation device can operate underwater for a long time without spending a lot of manpower and material resources to lift it out of the sea surface for service. Cost of existing maintenance methods is greatly reduced, maintenance efficiency is improved, and the ocean power generation device can be truly commercialized. Moreover, all the service personnel perform service on the seal inside the device, so maintenance operations are convenient.

Although the disclosure has been disclosed by the preferred embodiment in the above, it is not intended to limit the disclosure and any person familiar with the art can make some changes and embellishments without departing from the spirit and scope of the disclosure; therefore, the scope of protection of the disclosure should be subject to a scope of protection as claimed in the claims.

What is claimed:

1. A sealing system capable of direct removal or replaceable underwater, which is applicable for a horizontal axis ocean power generation device, the ocean power generation device having at least two variable-pitch blades and the sealing system being correspondingly arranged at a root of each of the blades, wherein the sealing system comprises:
    at least one first seal; and
    at least one second seal located at a side of the at least one first seal proximate to seawater, the at least one second seal not functioning to seal when the ocean power generation device operates normally, the at least one first seal functioning to seal when the ocean power generation device operates normally, and when the at least one first seal needs to be removed or replaced, the at least one second seal operating to function to seal;
    wherein the sealing system further comprises a water leakage protection device which is located at a side of the at least one first seal away from seawater and the water leakage protection device comprises
        a sealed water storage tank to collect and store seawater leaked from the at least one first seal; and
        a drain pipe, one end of the drain pipe is communicated with the sealed water storage tank, the seawater stored in the sealed water storage tank being discharged through the drain pipe.

2. The sealing system according to claim 1, wherein the sealing system further comprises at least one third seal, the at least one third seal being located at a side of the at least one first seal proximate to the seawater to resist silt.

3. The sealing system according to claim 1, wherein the sealing system further comprises a one-way water stop valve located in a pipeline of the drain pipe.

4. The sealing system according to claim 1, wherein a bottom of the water storage tank is obliquely disposed, and is obliquely disposed in a direction from proximate to the first seal to away from the first seal, and the drain pipe is communicated with a lowest position of the bottom of the water storage tank.

5. The sealing system according to claim 1, wherein the ocean power generation device comprises a hub, a generator, a spindle connecting the hub and the generator, a first sealed cabin and a second sealed cabin, the hub being located in the first sealed cabin, the generator being located in the first sealed cabin or the second sealed cabin, the first sealed cabin rotating with the hub, the second sealed cabin being relatively stationary, and the other end of the drain pipe passing through an interior of the spindle to discharge the seawater stored in the water storage tank into the second sealed cabin.

6. The sealing system according to claim 5, further comprising a water collecting tank and a water pump, the water collecting tank being located in the second sealed cabin to collect seawater discharged from the drain pipe, and the water pump sucking the seawater in the water collecting tank above a water surface for discharging.

7. The sealing system according to claim 6, further comprising an outer shaft, one end of which is communicated with the second sealed cabin and the other end of which is located above the water surface, the water pump sucking the seawater in the water collecting tank above the water surface through the outer shaft for discharging.

8. The sealing system according to claim 1, wherein the at least one first seal and/or the water leakage protection device has a half or halved structure.

9. A sealing system capable of direct removal or replaceable underwater, which is applicable for a horizontal axis ocean power generation device, the ocean power generation device comprising a hub, a generator and a spindle connecting the hub and the generator, the sealing system being arranged on the spindle, wherein the sealing system comprises:
    at least one first seal; and
    at least one second seal located at a side of the at least one first seal proximate to seawater, the at least one second seal not functioning to seal when the ocean power generation device operates normally, the at least one first seal functioning to seal when the ocean power generation device operates normally, and when the at least one first seal needs to be removed or replaced, the at least one second seal operating to function to seal;
    wherein the sealing system further comprises at least one third seal, the at least one third seal being located at a side of the at least one first seal proximate to the seawater to resist silt.

10. The sealing system according to claim 9, wherein the sealing system further comprises a water leakage protection device which is located at a side of the at least one first seal away from seawater and the water leakage protection device comprises:
    a sealed water storage tank to collect and store seawater leaked from the at least one first seal; and
    a drain pipe, one end of which is communicated with the sealed water storage tank, the seawater stored in the sealed water storage tank being discharged through the drain pipe.

11. The sealing system according to claim 10, wherein the ocean power generation device further comprises a first sealed cabin and a second sealed cabin, the hub being located in the first scaled cabin, the generator being located in the first sealed cabin or the second sealed cabin, the first sealed cabin rotating with the hub, the second sealed cabin being relatively stationary, and the other end of the drain pipe passing through an interior of the spindle to discharge the seawater stored in the water storage tank into the second sealed cabin; and the interior of the spindle allowing service personnel to pass through, and the spindle being provided with service ports at the first sealed cabin and the second sealed cabin, respectively, which allow the service personnel to enter and exit.

12. The sealing system according to claim 9, wherein the second seal is an air shroud type maintenance air seal, a certain gap is kept between a sealing lip of the second seal and a surface of the blade shaft when the ocean power generation device operates normally, and a lip of the air shroud protrudes and forms a tight contact sealing with the surface of the shaft when the first seal needs to be replaced.

13. The sealing system according to claim 9, wherein a third seal most proximate to the seawater is a J-shaped lip seal ring, which radially presses to form contact sealing by its own elastic tension.

* * * * *